(12) United States Patent
Hengstler et al.

(10) Patent No.: US 12,460,960 B2
(45) Date of Patent: Nov. 4, 2025

(54) MEASURING DEVICE, ATTACHMENT SYSTEM, MEASURING ASSEMBLY AND METHOD

(71) Applicant: VEGA Grieshaber KG, Wolfach (DE)

(72) Inventors: Clemens Hengstler, Haslach (DE); Matthias Schmidt, Schonach (DE)

(73) Assignee: VEGA Grieshaber KG, Wolfach (DE)

( * ) Notice: Subject to any disclaimer, the term of this patent is extended or adjusted under 35 U.S.C. 154(b) by 113 days.

(21) Appl. No.: 18/476,948

(22) Filed: Sep. 28, 2023

(65) Prior Publication Data

US 2024/0125637 A1 Apr. 18, 2024

(30) Foreign Application Priority Data

Oct. 12, 2022 (DE) ...................... 10 2022 126 507.2

(51) Int. Cl.
G01F 23/28 (2006.01)
(52) U.S. Cl.
CPC .................. *G01F 23/282* (2013.01)
(58) Field of Classification Search
None
See application file for complete search history.

(56) References Cited

U.S. PATENT DOCUMENTS

| 2015/0014141 A1* | 1/2015 | Rao | G06V 40/63 |
| | | | 200/600 |
| 2023/0130890 A1* | 4/2023 | Hengstler | G01F 23/284 |
| | | | 73/290 R |

FOREIGN PATENT DOCUMENTS

| DE | 10142944 A1 | 3/2003 |
| DE | 102020205173 A1 | 10/2021 |

* cited by examiner

*Primary Examiner* — Thomas S McCormack
(74) *Attorney, Agent, or Firm* — Wood Herron & Evans LLP

(57) ABSTRACT

A measuring device with a filling and/or limit level sensor for measuring a filling level and/or limit level of a filling material in a container having a container wall and an attachment system for attaching the filling and/or limit level sensor to the container wall, wherein the attachment system comprises: a first adhesive surface, a second adhesive surface, a first adhesive arranged or for arrangement on the first adhesive surface, and a second adhesive arranged or for arrangement on the second adhesive surface.

13 Claims, 4 Drawing Sheets

MEASURING DEVICE, ATTACHMENT SYSTEM, MEASURING ASSEMBLY AND METHOD

RELATED APPLICATIONS

This application claims priority to German Application No. DE 10 2022 126 507.2 filed Oct. 12, 2022, which is hereby incorporated by reference in its entirety.

FIELD OF THE INVENTION

The invention relates to a measuring device with a filling and/or limit level sensor, an attachment system for attaching a filling and/or limit level sensor, a measuring assembly with a measuring device and a method for attaching a filling and/or limit level sensor.

BACKGROUND OF THE INVENTION

In particular, the invention relates to a measuring device with a filling level sensor by means of which filling levels of filling material, for instance in a container or pipe or channel, can be measured. In this case, the filling level in the container, pipe or channel is determined continuously. The invention also relates to a measuring device with a limit level sensor. The limit level sensor detects when a predetermined filling level, the so-called limit level, is reached. The limit level sensor may be configured as a limit level switch. In the context of this document, the term "filling level" refers to a filling height. The filling material may be liquids, pastes, powders, or rough bulk material, for example.

Filling and/or limit level sensors have in common that they must be mounted or attached such that they are capable of measuring the filling level of the filling material. Most frequently, the mounting or attachment is supposed to be permanent and safe.

For mounting a filling and/or limit level sensor in a classic manner, it is known to make mechanical changes to the container accommodating the filling material, in order to mount threaded connectors, flange adapters etc., for instance.

In practice, the subsequent mounting of a filling and/or limit level sensor on containers often causes problems because this subsequent mounting entails a larger effort to make mechanical changes to the container on-site, or to obtain a load-bearing attachment even without mechanical changes. Also, the containers frequently are returnable containers that are not owned by the operator of the measuring point and therefore ought not to be damaged.

SUMMARY OF THE INVENTION

Therefore, it is the object of the invention to provide an evolved measuring device, an evolved attachment system, an evolved measuring assembly and an evolved method.

Advantageous embodiments and variants of the invention become apparent from the dependent claims and the following description. The features cited individually in the dependent claims may be combined in any technologically meaningful manner both with each other and with the features presented in more detail in the following description and can represent other advantageous embodiment variants of the invention.

The measuring device according to the invention comprises a filling and/or limit level sensor. The filling and/or limit level sensor serves for measuring a filling level and/or limit level of a filling material in a container having a container wall. The measuring device also comprises an attachment system for attaching the filling and/or limit level sensor to the container wall. Within the context of this document, the filling and/or limit level sensor is also referred to, in short, as a sensor.

The attachment system comprises a first adhesive surface, a second adhesive surface, a first adhesive arranged or for arrangement on the first adhesive surface, and a second adhesive arranged or for arrangement on the second adhesive surface.

Thus, the advantages of two different gluing methods can be combined. Possible disadvantages of a gluing method or of a first adhesive, can be overcome in a targeted manner by means of the second gluing method or the second adhesive. These disadvantages include, e.g. the strong dependence of the adhesiveness of a pressure-sensitive adhesive, e.g. an adhesive tape, on the surface to be subjected to gluing and the limited possibility of adapting a pressure-sensitive adhesive to containers to which something is to be glued. Thus, a measuring device can be obtained which ensures a reliable and load-bearing attachment of the sensor to a multitude of different container walls. In this way, the attachment can become easier to perform and/or more capable of bearing loads. For example, the possible requirement of mechanically fixing the sensor to be attached until a stable adhesive connection exists due to the solidification of an adhesive can be dispensed with.

Preferably, the first and second adhesives have different properties, and further preferably, properties supplementing one another.

Within the context of this document, the term "second adhesive" means an adhesive that differs from the first adhesive in at least one distinguishing feature. The distinguishing feature may relate to the viscosity and/or the solidification mechanism of the second adhesive and/or the solidification time—or the time that one must wait for a solid adhesive effect of the second adhesive—and/or the cohesion and/or the adhesion and/or the tack of the second adhesive.

Preferably, a short-term or preliminary attachment of the sensor to the container wall can be enabled by means of the first adhesive.

Preferably, an attachment of the sensor to the container wall that is particularly capable of bearing loads or is particularly permanent or final can then be accomplished by means of the second adhesive.

The first adhesive may have a solidification mechanism. Preferably, the first adhesive has no solidification mechanism. Preferably, the first adhesive is free of a solidification mechanism.

Preferably, the first adhesive is a pressure-sensitive adhesive. Within the context of this document, the term "pressure-sensitive adhesive" means a permanently tacky adhesive. Preferably, the permanent tackiness is present at at least 20 degrees Celsius. The pressure-sensitive adhesive may have, or be formed by, a liquid with a glass transition temperature of less than −10 degrees Celsius or less than −20 degrees Celsius. The glass transition temperature may be between −20 degrees Celsius and 70 degrees Celsius. The liquid may be extremely highly viscous, i.e. have a viscosity of more than 1 Pascal seconds or more than 10 Pascal seconds or more than 100 Pascal second and less than 1013 Pascal seconds at a temperature of 20 degrees Celsius, for example. The liquid may be elastic.

The first adhesive may be transferable from a pressure-sensitive adhesive to an adhesive with a higher adhesion and/or cohesion by means of a solidification mechanism. e.g. a subsequent chemical hardening.

The attachment system may comprise an adhesive tape which may have the first adhesive. The first adhesive may be arranged on both sides of the adhesive tape; thus, the adhesive tape may be double-sided.

Preferably, the first adhesive is an at least almost directly positioning adhesive, e.g. a pressure-sensitive adhesive, a contact adhesive, a hot-melt adhesive, a hot-melt pressure-sensitive adhesive or an adhesive comprising cyanoacrylate (fast-acting adhesive). Measured with the testing method "loop tack", the tack, also referred to as "tackiness", of the first adhesive may for this purpose be in a range of from 10 N to 100 N or 30 N to 100 N or 30 N to 200 N. Thus, a particularly fast and reliable positioning of the sensor on the container wall by means of the first adhesive can be possible.

The second adhesive may be an adhesive with a solidification mechanism, e.g. with a physical and/or chemical solidification mechanism. Adhesives with a solidification mechanism may have a large adhesion spectrum, so that an adaptation to a specific container material may be dispensed with or be carried out with less accuracy. In addition, adhesive bonds with a very high load-bearing capacity can be obtainable with them. In this way, the subsequent sensor installation may be improved particularly effectively.

Preferably, the second adhesive has a solidification time of more than 4 minutes or 30 minutes and preferably of less than 25 hours at 20 degrees Celsius and/or a relative air humidity of 50%. In the context of this document, the term "solidification time" refers to the time after which the adhesive reaches more than 50% of its final strength.

The second adhesive surface may be smaller than the first adhesive surface. Preferably, it is larger.

Preferably, the attachment system comprises an attachment adapter. Within the context of this document, the attachment adapter is also referred to, in short, as an adapter. The sensor, e.g. the sensor housing, can be detachably connectable to the adapter, e.g. be capable of being screw-connected therewith. For this purpose, the adapter may have sensor attachment means, which may comprise at least one thread. The at least one thread may be configured in a manner complementary to a sensor thread, e.g. on the sensor housing.

With the attachment system, a combined adhesive bond of the sensor and/or the adapted to the container wall can preferably be obtained with the first adhesive and the second adhesive.

If the second adhesive has a solidification mechanism, the first adhesive preferably fixes the sensor and/or the adapter until the second adhesive has completely solidified. Preferably, the strength of the attachment of the sensor to the container wall is predominantly obtained by means of the second adhesive after the second adhesive has solidified. This preferably applies even if, as in one embodiment, the first adhesive surface is larger than the second adhesive surface. Thus, the force that can be transmitted via the second adhesive surface between the sensor and the container wall is preferably greater than the force that can be transmitted via the first adhesive surface.

Preferably, the sensor and/or the adapter is positioned, after the mounting, by the first adhesive, preferably exclusively, during the solidification time of the second adhesive.

Preferably, the second adhesive is liquid in the non-solidified state. Preferably, the second adhesive has in the non-solidified state a viscosity of less than 10 Pascal seconds or 50 Pascal seconds at a temperature of 20 degrees Celsius.

In a particularly preferred embodiment, the second adhesive is a two-component adhesive. In that case, the solidification can be particularly reliable and independent of further external conditions, such as the availability of air moisture.

Preferably, the initial strength of the first adhesive exceeds the initial strength of the second adhesive. Preferably, the final strength of the second adhesive exceeds the final strength of the first adhesive. Here, the strength is the transmissible force per cross-sectional surface area.

Preferably, the tack of the second adhesive is lower than the tack of the first adhesive. Measured with the testing method "loop tack", the tack of the second adhesive may be in a range of from 0.5 N to 10 N.

The adhesion of the second adhesive with polyethylene, in particular HDPE, is preferably greater than the adhesion of the first adhesive with polyethylene, in particular HDPE, in particular in the fully solidified state of the second adhesive. Thus, a good final strength of the attachment of the sensor to the container wall that can be achieved with the attachment system can be obtained. In the context of this document, HDPE refers to polyethylene with a high density, in particular between 0.94 g/cm3 and 0.97 g/cm3.

The cohesion of the second adhesive is preferably greater than the cohesion of the first adhesive, in particular in the solidified state of the second adhesive. A particularly good final strength of the attachment of the sensor to the container wall that can be achieved with the attachment system can be obtained also due to this fact.

In a preferred embodiment, the first adhesive surface is at least partially different from the second adhesive surface and may be adjacent to the second adhesive surface and/or extend spaced-apart from the latter.

The first adhesive surface preferably lies in exactly one plane.

The second adhesive surface may lie in exactly one plane or in several planes extending parallel or at an angle, e.g. at a right angle, to each other. The second adhesive surface may also lie in no plane at all but be curved.

Preferably, the first adhesive surface is annular, thus having an annular surface.

Within the context of this document, an annular surface means, in particular, every preferably contiguous surface with a central recess. In this case, the annular shape may have a round, e.g. circular or oval inner or outer outline, or an angled one. The annular surface may be planar, i.e. lie in exactly one plane. The annular surface may have the shape of a circular ring. The annular surface may be curved or lie in different planes.

Preferably, the first adhesive surface is formed to run around an inner surface. Preferably, the first adhesive surface defines or delimits the inner surface. The inner surface may be oval, e.g. egg-shaped, shaped like a circular surface, or elliptical. The inner surface may be polygonal.

The first adhesive surface or the first adhesive may have a sealing effect and contribute to, for example, sealing a portion between the sensor and the container wall from the surroundings, so that no moisture can enter and no condensate can form. The first adhesive surface or the first adhesive may result in a seal or first seal towards a possible radar antenna of the sensor. The possible annular shape of the first sealing surface can promote the sealing effect.

Preferably, the second adhesive surface is arranged within the first adhesive surface or on the inner surface of the first adhesive surface. Preferably, the first adhesive surface is formed to run around the second adhesive surface.

In a preferred embodiment, the second adhesive surface is annular or disk-shaped, thus having an annular or disk-shaped surface.

Within the context of this document, a disk-shaped surface area, using the term broadly, in particular means every filled surface. Within the context of this document, a disk-shaped surface area, using the term broadly, means every surface free of a central recess. In this case, the disk-shaped surface may have a round, e.g. circular or oval, outline, or an angled one. The disk-shaped surface may be planar, i.e. lie in exactly one plane. The disk-shaped surface may have the shape of a circular surface. The disk-shaped surface may also bulge or lie in different planes.

Preferably, the second adhesive surface is formed to be contiguous.

Particularly if the second adhesive surface is disk-shaped, the sensor preferably measures through the second adhesive. Preferably, the measuring device comprises a device for arranging the second adhesive on the second adhesive surface in the form of a homogeneous layer, i.e. free of inclusions or bubbles.

Preferably, the sensor can transmit and/or receive electromagnetic radiation. The sensor may be a radar sensor.

If the sensor is a radar sensor, then the second adhesive, after a possible solidification, has such a small permittivity (also referred to as a relative permittivity of DK value) that the radar measurement is not adversely affected. Preferably, the DK value of the second adhesive after its possible solidification is in a range of 1.1 to 4.

The sensor may include a sensor lens. Within the context of this document, the term "sensor lens" means a component that is transparent to the electromagnetic radiation that can be transmitted and/or received by the sensor. Within the context of this document, the term "sensor lens" preferably means a preferably dielectric component directing the electromagnetic radiation of the sensor, in particular the radar sensor, in the case of a freely emitting sensor. In a sensor that does not emit freely, the sensor lens may serve for coupling the electromagnetic radiation onto a probe, e.g. a rod or a cable and/or for insulating the probe.

The deviation of the DK value of the second adhesive after the latter's possible solidification from the DK value of the sensor lens may be smaller than 5% or 10% or 50% of the DK value of the sensor lens.

Particularly if the second adhesive surface is disk-shaped, then the sensor, e.g. a sensor lens of the sensor, may have contact with the second adhesive, that is, in particular, be glued to the container wall, preferably in a non-detachable manner. Thus, the sensor, e.g. its sensor lens, may be protected from moisture, condensate and/or dirt. The container and the sensor, of the sensor lens of the latter, can then form a unit by being glued together by means of the second adhesive.

Alternatively, even given a disk-shaped second adhesive surface, the latter may be arranged exclusively on the adapter, so that no gluing of the sensor takes place.

The second adhesive surface may be concentric with the first adhesive surface.

If both adhesive surfaces are annular, the diameter of the second adhesive surface may be smaller than the diameter of the first adhesive surface.

If the second adhesive surface is annular, a region in its center may remain free from adhesive, in particular. In one embodiment, the sensor measures through this region that remains free. Thus, a measurement by the sensor through adhesive can be avoided. This region that remains free may be sealed from adhesive, in particular from second adhesive prior to the latter's possible solidification, by means of a seal, e.g. an O-ring. As an alternative or addition to this seal, the first adhesive surface may provide for this purpose a, relative to the second adhesive surface, inner ring. The first adhesive surface may provide this ring in addition to another ring of the first adhesive surface.

The second adhesive surface or the second adhesive may also have a sealing effect and contribute to, for example, sealing a portion between the sensor and the container wall from the surroundings, so that no moisture can enter and no condensate can form. This portion may be the region than remains free in the center of the second adhesive surface. The second adhesive surface or the second adhesive may result in a seal or second seal towards a possible radar antenna of the sensor. If the second adhesive surface or adhesive is annular, then this sealing effect may be improved. If the second adhesive is an adhesive with a solidification mechanism, e.g. a two-component adhesive, then this sealing effect may be particularly permanent and reliable.

Thus the measuring device can enable a dual seal of a portion between the sensor and the container wall from the surroundings, caused by two different adhesives.

Thus, a possible radar antenna of the sensor, for instance, may be reliably sealed thereby. Due to the region that remains free, caused by the annular adhesive surfaces, more specifically by their central recesses, a possible radar antenna of the sensor may be free, i.e. not be in contact with adhesive, in particular.

Preferably, the first adhesive surface is configured for gluing the sensor to the container wall with the first adhesive. Preferably, the second adhesive surface is configured for gluing the sensor to the container wall with the second adhesive.

Preferably, the sensor comprises a sensor housing. The sensor housing can enclose the entire sensor or a part of the sensor. The sensor lens may be a part of the sensor housing.

Preferably, the first adhesive surface is arranged on the sensor, e.g. the sensor housing.

Alternatively, or additionally, the first adhesive surface may be arranged on the adapter.

Preferably, the second adhesive surface is arranged on the sensor, e.g. the sensor housing.

Alternatively, or additionally, the second adhesive surface may be arranged on the adapter.

If both adhesive surfaces are arranged exclusively on the adapter, this may result in a simple possibility of replacing the sensor, e.g. in the case of the sensor or container being defective.

An at least partial arrangement of one of the two adhesive surfaces, in particular the second adhesive surface, on the sensor, e.g. the sensor housing, may result in an attachment that is particularly reliably capable of bearing loads and is reliably tight.

The first and second adhesive surfaces may be arranged as follows, for instance:

The first adhesive surface may be arranged on the adapter, and the second adhesive surface on the adapter and the sensor housing. In this case, both adhesive surfaces may be annular. A region through which the sensor can measure may remain free in their center. In order to seal this region against adhesive, in particular against second adhesive prior to its solidification, a seal may be provided on the sensor housing and/or the adapter. The region that remains free may also be sealed, instead of or in addition to by a seal, by means of a circumferentially extending projection of the sensor or adapter. The region that remains free may also be sealed, instead of or in addition to by a seal or a circumferentially extending projection, by means of the first adhesive. As an addition or alternative to a ring outward relative to the second adhesive surface, the first adhesive surface may then provide an inner ring.

The first adhesive surface and the second adhesive surface may each be arranged exclusively on the adapter. In this case, both adhesive surfaces may be annular. Both adhesive surfaces may be concentric. The first adhesive surface may be arranged outside the second adhesive surface and arranged to run around the latter. Alternatively, the second adhesive surface may be arranged outside the first adhesive surface and arranged to run around the latter.

The first adhesive surface may be arranged on the adapter, and the second adhesive surface on the adapter and the sensor housing. In this case, the first adhesive surface may be annular, and the second adhesive surface may be disk-shaped. Preferably, the sensor in this embodiment measures through the second adhesive.

A disk-shaped second adhesive surface may also be exclusively provided by the adapter.

The sensor may have a modular configuration and comprise, in addition or as an alternative to the adapter, a detachable element or module. This element or module may include the sensor lens or be formed by it. The first adhesive surface and/or the second adhesive surface may each be at least partially arranged on the detachable element or module. This may also result in a replaceability, e.g. in the case of the sensor, module or container being defective. Both adhesive surfaces may be arranged on the sensor, e.g. the sensor housing, or the detachable element or module.

Preferably, the first adhesive surface is configured such that, in the installed position of the sensor on the container, it extends parallel to the container wall, preferably spaced apart from the container wall by the layer thickness of the first adhesive or a possible adhesive tape comprising the first adhesive. Within the context of this document, the term "installed position" means the position of the sensor that it assumed in the state or being attached or glued to the container. The second adhesive surface may be configured accordingly. If the second adhesive surface, additionally or alternatively, is configured such that, in the installed position of the sensor, it forms with the container wall a cavity for accommodating the second adhesive, then a precondition for a particularly reliable attachment is provided. Preferably, the boundary surfaces of the cavity are formed by the second adhesive surface and the container wall. Alternatively, further boundary surfaces of the cavity may be provided. The second adhesive surface may be concave. The cavity may be provided by a depression of the measuring device, e.g. an adapter depression. Particularly in the embodiment in which the second adhesive is a two-component adhesive, the boundary surfaces of the cavity may be diffusion-impermeable, and the cavity may be tightly sealed against its surroundings, except for a possible filling and/or vent opening. Alternatively, the boundary surfaces may be diffusion-permeable or leave further openings or opening slits towards the surroundings.

In one embodiment, the attachment system provides an adhesive filling opening reaching into the cavity and/or a vent opening. The device for arranging the second adhesive in a homogeneous layer on the second adhesive surface may include the adhesive filling opening and/or the vent opening or be formed thereby. The adhesive filling opening and the vent opening may be arranged on opposite regions or sides of the cavity. The adhesive filling opening and the vent opening may be arranged on the same boundary surface of the cavity, side-by-side or opposite each other. The clear distance of the adhesive filling opening from the vent opening may be greater than 50% or 70% or 90% of the largest external dimension of the boundary surface of the cavity having the adhesive filling opening and the vent opening. Thus, the vent opening may be configured such that a user filling adhesive into the adhesive filling opening is able to recognize, due to adhesive coming out of the vent opening, that the cavity is completely filled with adhesive. In that case, the vent opening may preferably also be referred to as an indicator opening. The filling opening may be configured as an injection opening. The size of the filling opening may approximately be between 0.8 mm2 and 80 mm2. The filling opening may have an at least substantially circular cross section, with a diameter that may be between 1 mm and 1 cm.

The size of the vent opening may also approximately be between 0.8 mm2 and 80 mm2. The size of the vent opening may also approximately be between 0.008 mm2 and 0.8 mm2.

The vent opening may have an at least substantially circular cross section, with a diameter that may be between 1 mm and 1 cm, or between 0.1 mm and 1 mm.

The vent opening may have the same size as the adhesive filling opening.

Alternatively, the vent opening may be smaller than the adhesive filling opening. Particularly in this embodiment, the vent opening may be configured to be so small that it can act as a throttle or orifice for exiting air and/or exiting adhesive, preferably such that filling in adhesive at an increased pressure is possible. This may further reduce the danger of inclusions and bubbles being created in the second adhesive layer.

If the sensor is a radar sensor, the advantages of the invention may come into effect particularly well. For radar sensor are capable of measuring through nonmetallic container walls. Therefore, a mechanical change to the containers is unnecessary. Thus, it is possible to attach the sensor to the container wall without modifying the container for this purpose. Thus, it is particularly well suited for subsequent attachment without an opening in the container wall. The sensor lens may be a radar lens. Preferably, the radar sensor has a sensor unit for emitting and/or receiving a radar signal and/or an evaluation unit for determining, based on the radar signal, a measurement signal correlating with the filling level and/or the limit level. The sensor unit may include a radar antenna.

If the measuring device, for instance in the case of a disk-shaped second adhesive surface, is configured for the sensor to measure through the second adhesive, then the thickness and/or the shape of the second adhesive layer or the cavity and/or the refractive index of the solidified second adhesive may be selected such that a destructive interference of radar beams is obtained, which are reflected on the side of the second adhesive layer facing towards the sensor and on the surface of the container wall facing towards and/or away from the sensor. In this manner, the second adhesive may form an anti-reflective coating of the container wall.

An attachment system according to the invention serves for attaching a filling and/or limit level sensor to a container wall of a container. The attachment system comprises a first adhesive surface, a second adhesive surface, a first adhesive arranged or for arrangement on the first adhesive surface, and a second adhesive arranged or for arrangement on the second adhesive surface.

The attachment system preferably comprises an attachment adapter on which the first and/or the second adhesive surface may be at least partially arranged. The attachment system may be configured such as is described above in connection with the measuring device.

The measuring assembly according to the invention comprises a container having a container wall and a measuring device and is characterized in that the measuring device is configured in accordance with the above description, and in that the filling and/or limit level sensor of the measuring device is arranged on the container wall by means of the attachment system of the measuring device.

The sensor of the measuring assembly may be arranged inside, in the container. Preferably, it is arranged on the outside of the container.

The container may be a tank.

The container may be an intermediate bulk container, or IBC.

The container wall may include a plastic, e.g. HDPE, or be formed therefrom.

The container may be a silo. The container wall may include a metal or be formed therefrom.

The container wall may have an opening in the region in which the sensor is arranged on the container.

Alternatively, the container wall preferably has no opening in the region in which the sensor is arranged on the container.

Particularly if the container wall is made of plastic in the region in which the sensor is arranged on the container, the sensor is capable of measuring through the container wall.

Preferably, the measuring assembly has a dual seal of a portion between the sensor and the container wall from the surroundings, caused by two different adhesives.

A method according to the invention for attaching a filling and/or limit level sensor to a container wall has the following method steps:

Positioning the filling and/or limit level sensor and/or an attachment adapter on the container wall by gluing the sensor or the adapter to the container wall by means of a first adhesive. Gluing the filling and/or limit level sensor and/or the attachment adapter to the container wall by means of a second adhesive.

The attachment of the filling and/or limit level sensor to the container wall may preferably also be referred to as an adhesive installation.

The gluing by means of the second adhesive may include the application of the second adhesive onto the sensor or adapter, or the filling of the second adhesive into the cavity between the second adhesive surface and the container wall. The application or the filling may take place at the same time as or prior to the positioning. Preferably, the application or the filling takes place after the positioning.

Preferably, the gluing with the second adhesive results in a reinforcement of the adhesive connection obtained with the first adhesive.

The positioning may include a—e.g. manual—pressing of the sensor and/or of an attachment adapter against the container wall. The pressing may take place over a period of time that may be between 0.1 seconds and 60 seconds.

The sensor may be part of a measuring device comprising an attachment adapter, and the method may then include the following method steps:

Positioning the attachment adapter on the container wall by gluing by means of the first adhesive, applying or filling the second adhesive particularly onto the attachment adapter or into the cavity.

Attaching the sensor to the attachment adapter.

The attachment of the sensor to the attachment adapter, e.g. by screwing, may take place prior or subsequent to awaiting a possible solidification of the second adhesive.

Particularly if the second adhesive surface is disk-shaped, then, after the application of filling-in of the second adhesive, the sensor can be attached to the adapter prior to a possible solidification of the second adhesive, so that the sensor, or the sensor housing, e.g. a sensor lens, is in contact with the second adhesive.

Preferably, the method is free of method steps modifying the container. Thus, the sensor is preferably attached to the container wall without any modifications to the container.

All of the features described in the context of this document can be capable of being combined with the claimed measuring device, the claimed attachment system, the claimed measuring assembly and the claimed method.

The present invention is explained in detail below based on exemplary embodiments with reference to the attached Figures. In the Figures:

DETAILED DESCRIPTION OF THE DRAWINGS

Figure 1:
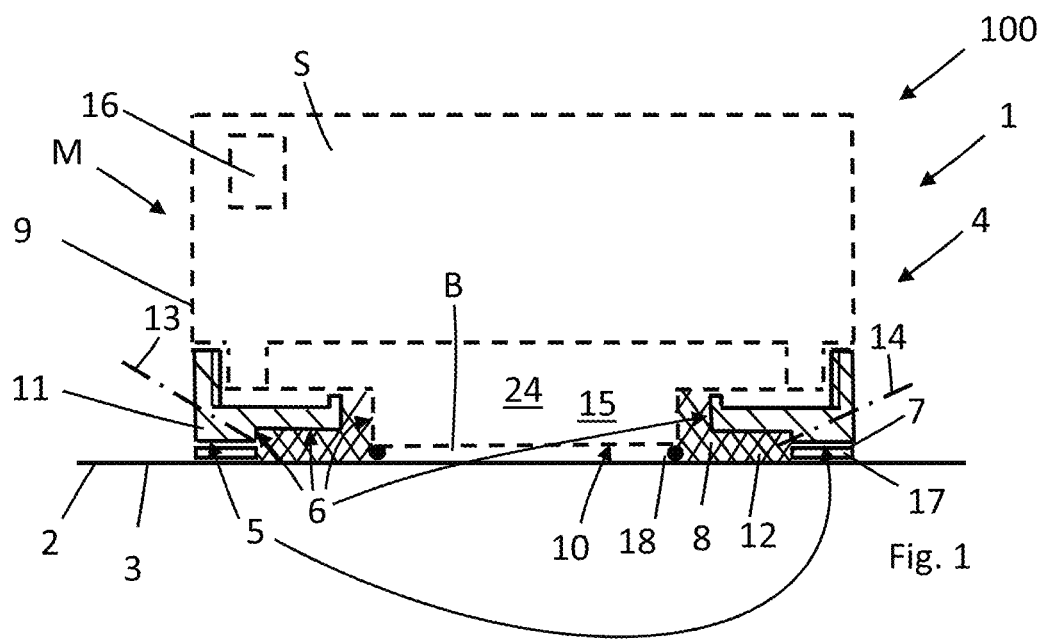
FIG. 1 shows a partially cross-sectional view of a first exemplary embodiment of a measuring device with a first exemplary embodiment of an attachment system.

The exemplary embodiment of a measuring device 100 shown in FIG. 1 comprises a filling and/or limit level sensor 1 configured as a radar sensor S, which serves for measuring a filling level and/or limit level of a filling material in a container 3 having a container wall 2. The measuring device 100 also comprises an attachment system 4 for attaching the filling and/or limit level sensor 1 to the container wall 2. The sensor 1 shown is in the installed position M.

The attachment system 4 comprises a first adhesive surface 5, a second adhesive surface 6, a first adhesive 7 arranged or for arrangement on the first adhesive surface 5, and a second adhesive 8 arranged or for arrangement on the second adhesive surface 6. The second adhesive 8 is represented with the crosshatched pattern.

The first adhesive surface 5 is annular, more specifically has the shape of a circular ring, is situated in exactly one plane, is different from the second adhesive surface 6 and is adjacent to the second adhesive surface 6.

The second adhesive surface 6 is arranged within the first adhesive surface 5 and is located in several planes extending at a right angle to each other. The second adhesive surface 6 is also annular and concentric with the first adhesive surface 5. A region through which the sensor 1 can measure remains free in its center. To seal this region B, which remains free, against the second adhesive 8 prior to its solidification, a seal 18 is provided, which is configured as an O-ring. In addition, this region B that remains free is sealed towards the outside by a dual seal caused by the two different adhesives 5, 6. Thus, the entry of moisture and a possible formation of condensate is reliably avoided thereby. The radar antenna 24 of the radar sensor S is sealed and completely free due to the region B that remains free, caused by the annular shape of the adhesive surfaces.

The attachment system 4 comprises a double-sided adhesive tape 17 having the first adhesive 7, which is a pressure-sensitive adhesive.

The second adhesive 8 is an adhesive with a chemical solidification mechanism, namely a two-component adhesive.

The sensor 1 has a sensor housing 9 enclosing the entire sensor 1, and the attachment system 4 comprises an attachment adapter 11. The first adhesive surface 5 is arranged on the attachment adapter 11, and the second adhesive surface 6 is arranged on the attachment adapter 11 and on the sensor housing 9. The first adhesive surface 5 is formed to run around the second adhesive surface 6.

The sensor comprises a sensor lens 10 as a part of the sensor housing 9.

The first adhesive surface 5 is configured such that, in the depicted installed position M of the sensor 1 on the container 3, it extends parallel to the container wall 2, namely spaced apart therefrom by the layer thickness of the double-sided adhesive tape 17 comprising the first adhesive 7. The second adhesive surface 6 is configured such that, in the depicted installed position M of the sensor 1, it forms with the container wall 2 a cavity 12 for accommodating the second adhesive 8. The cavity 12 is provided by an adapter depression.

As shown by dot-dashed lines, the attachment system 4 provides an adhesive filling opening 13 reaching into the cavity 12 and a vent opening 14.

The sensor 1 has a sensor unit 15 for emitting and/or receiving a radar signal and/or an evaluation unit 16 for determining, based on the radar signal, a measurement signal correlating with the filling level and/or the limit level. The sensor unit 15 includes a radar antenna 24 and a sensor lens 10.

The sensor housing 9 is detachably connected, i.e. screw-connected, with the attachment adapter 11 prior to the solidification of the second adhesive.

After the positioning of the measuring device 100 by means of the first adhesive 7, the second adhesive surface 6 was covered with the second adhesive 8 in a second step, by filling in the second adhesive 8 by means of the adhesive filling opening 13 and the vent opening 14 into the cavity 12.

Figure 2:
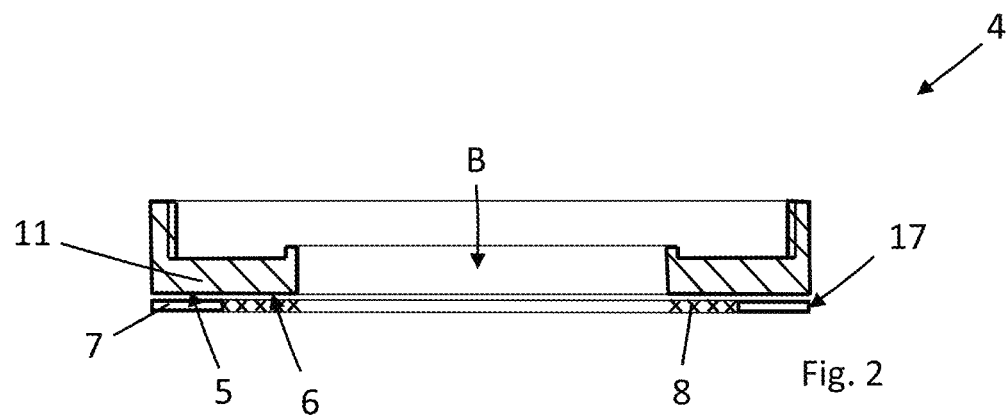
FIG. 2 shows a cross-sectional illustration of a second exemplary embodiment of an attachment system.

Further exemplary embodiments are shown in FIGS. 2 to 9 and 11. Unless otherwise stated, identical reference numerals in this case denote identical components with identical functions. In that regard, reference is made to the above explanation. In the following, some differences from the measuring device shown in FIG. 1 and the attachment system shown in FIG. 1 will be discussed:

In the exemplary embodiment shown in FIG. 2, the first adhesive surface 5 and the second adhesive surface 6 are each arranged exclusively on the adapter 11. The second adhesive surface 6 forms no cavity provided by an adapter depression. The second adhesive 8 was thinly applied to the second adhesive surface 6.

Figure 3:
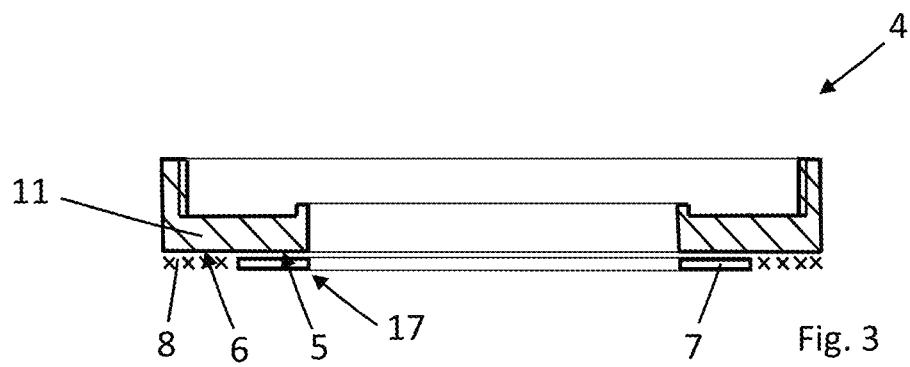
FIG. 3 shows a cross-sectional illustration of a third exemplary embodiment of an attachment system.

In the exemplary embodiment shown in FIG. 3, the second adhesive surface 6 is arranged outside the first adhesive surface 5 and arranged so as to run around the latter.

In the adapter 11 shown in FIGS. 2 and 3, no cavity and no adhesive filling opening or vent opening are provided.

Figure 4:
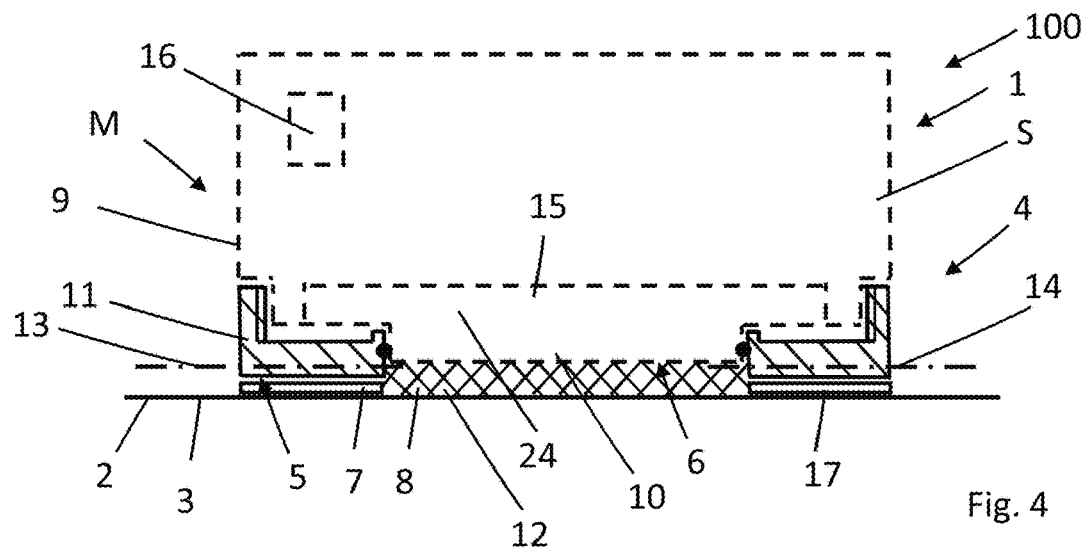
FIG. 4 shows a partially cross-sectional view of a second exemplary embodiment of the measuring device with a fourth exemplary embodiment of an attachment system.

In the exemplary embodiment shown in FIG. 4, the second adhesive surface 6 is disk-shaped, and in this exemplary embodiment, the sensor 1 measures through the second adhesive 8. The sensor lens 10 is in contact with the second adhesive agent 8 and glued to the container wall 2.

Figure 5:
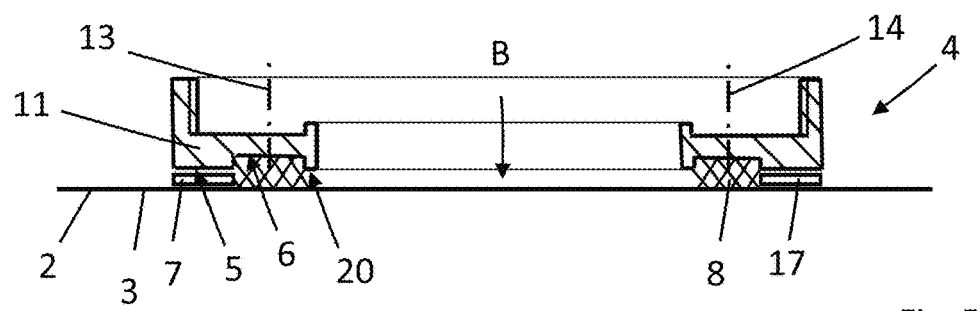
FIG. 5 shows a cross-sectional illustration of a fifth exemplary embodiment of an attachment system.

In the exemplary embodiment shown in FIG. 5, the region B that remains free is sealed, instead of by a seal, by means of a circumferentially extending projection 20 of the adapter 11.

Figure 6:
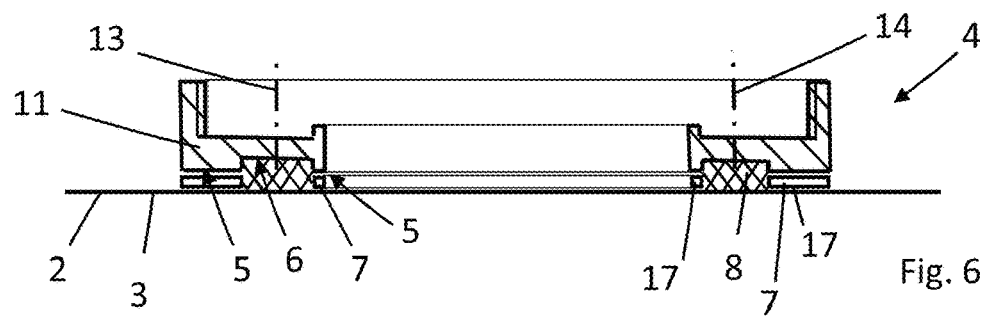
FIG. 6 shows a cross-sectional illustration of a sixth exemplary embodiment of an attachment system.

In the exemplary embodiment shown in FIG. 6, the region B that remains free is sealed, instead of by a seal, by means of the first adhesive 7. The first adhesive surface 5 provides for this purpose a, relative to the second adhesive surface, inner ring, in addition to another ring of the first adhesive surface 5, which extends outside the second adhesive surface 6.

Figure 7:
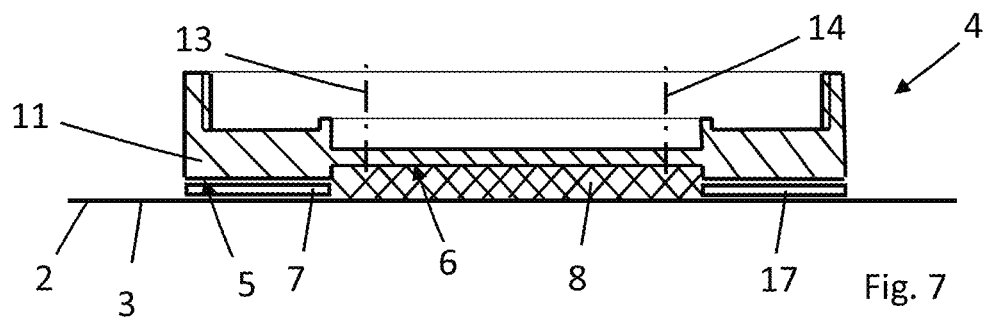
FIG. 7 shows a cross-sectional illustration of a seventh exemplary embodiment of an attachment system.

In the exemplary embodiment shown in FIG. 7, a disk-shaped second adhesive surface 6 is exclusively provided by the adapter 11, so that no gluing of the sensor 1 takes place.

Figure 8:
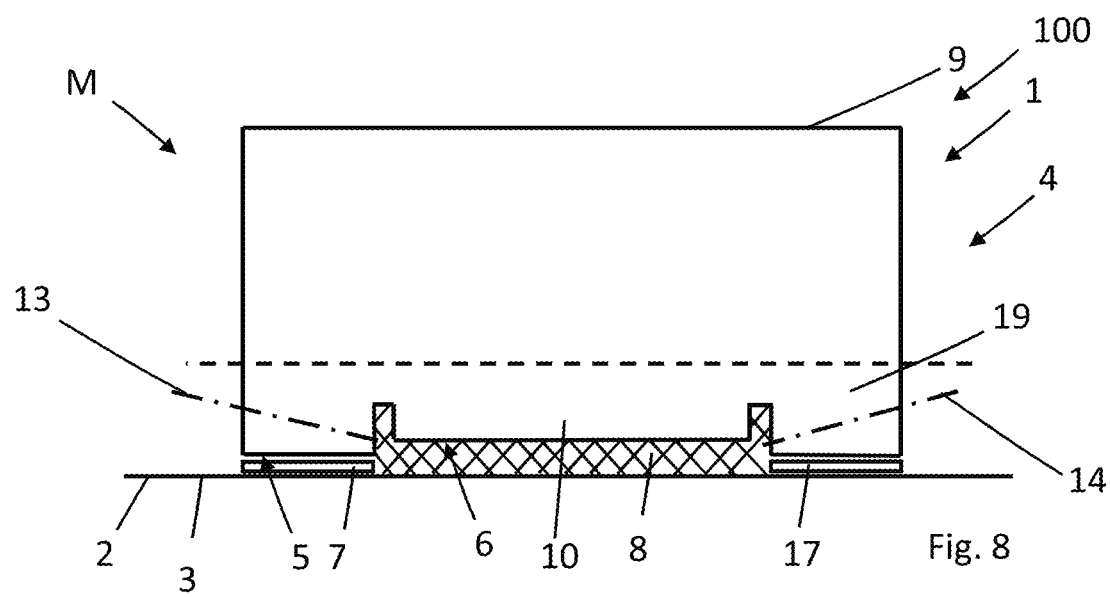
FIG. 8 shows a view of a third exemplary embodiment of a measuring device.

In the exemplary embodiment shown in FIG. 8, the sensor 1, as an alternative to the adapter 11, has a detachable module 19, which includes the sensor lens 10. The horizontal dashed line in FIG. 8 symbolizes the line of separation. The first adhesive surface 5 and the second adhesive surface 6 are arranged on this module 19.

The attachment adapter 11 shown in FIGS. 2, 3, 5, 6, 7 and 9 differs from the attachment adapter 11 shown in FIG. 1 in that the first adhesive surface 5 and the second adhesive surface 6 are each arranged exclusively on the adapter 11.

Figure 9:
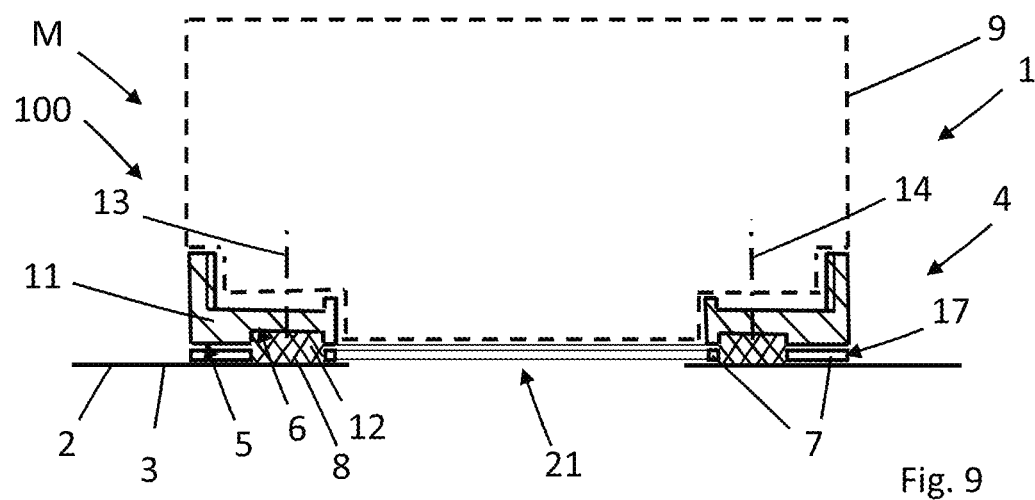
FIG. 9 shows an exemplary embodiment of a measuring assembly.

In the exemplary embodiment of a measuring assembly shown in FIG. 9, the container wall 2 has an opening 21 in the region in which the sensor 1 is arranged on the container 3. Other than in the other exemplary embodiments shown, the container wall here is not made from HDPE, but from metal, and the container 3 in the measuring assembly shown here was modified by incorporating the opening 21 for attaching the measuring device 100.

Figure 10:
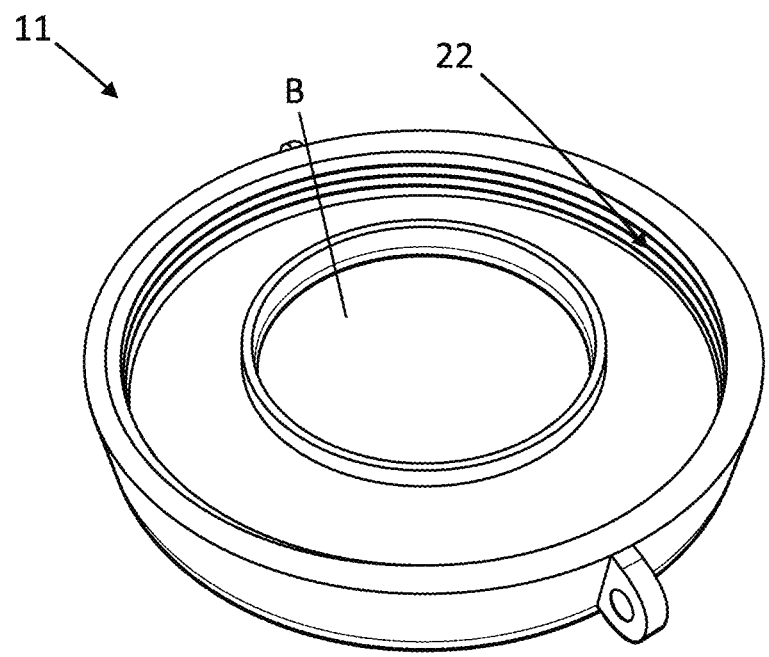
FIG. 10 shows a perspective view of the attachment adapter of the measuring assembly shown in FIG. 9.

FIG. 10 illustrates a shape of the adapter 11 with a female thread 22. The adapter shown in FIG. 10 may be, for instance, the adapter shown in FIG. 2 or FIG. 9.

Figure 11:
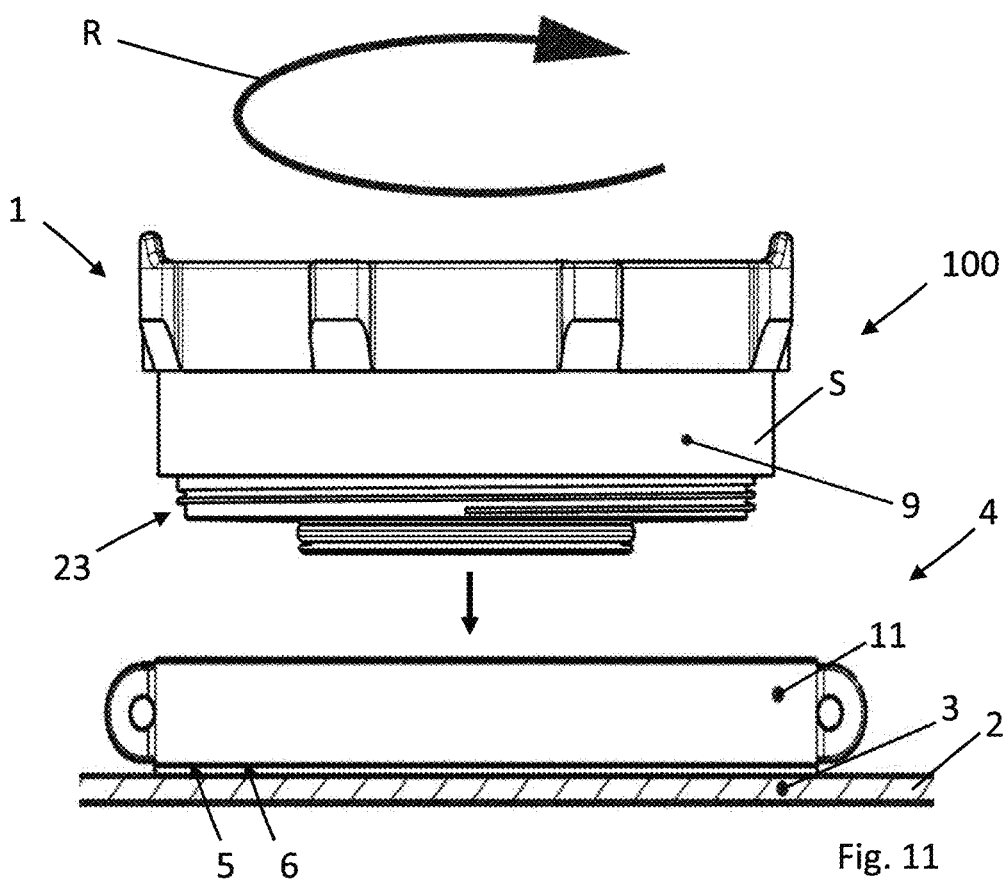
FIG. 11 shows an exemplary embodiment of an attaching method.

In the exemplary embodiment of the method for attaching the sensor 1 to the container wall 2 shown in FIG. 11, the positioning of the attachment adapter 11 on the container wall 2 has already taken place by gluing the attachment adapter 11 to the container wall 2 by means of the first adhesive 7 and gluing the adapter 11 to the container wall 2 by means of the second adhesive 8. For instance, the adapter 11 may correspond to the adapter 11 shown in FIG. 2 or FIG. 9. FIG. 11 illustrates the method step of attaching the sensor 1, more specifically the sensor housing 9, to the adapter 11 by screwing the male thread 23 of the housing into the female thread 22 of the adapter 11. The arrow R symbolizes the screwing direction. The method is free of the method steps modifying the container 3. Thus, the sensor 1 is attached to the container wall without any modifications to the container. In addition, FIG. 11 shows a shape of the housing 9 with a male thread 23. The housing shown in FIG. 11 may be the housing 9 shown, for example, in FIG. 1, 4 or 9.

The invention claimed is:

1. A measuring device with
    a filling and/or limit level sensor for measuring a filling level and/or limit level of a filling material in a container having a container wall and
    an attachment system for attaching the filling and/or limit level sensor to the container wall, wherein the attachment system comprises the following:
    a first adhesive surface,
    a second adhesive surface,
    a first adhesive arranged or for arrangement on the first adhesive surface, and
    a second adhesive arranged or for arrangement on the second adhesive surface
    wherein the first adhesive is a pressure-sensitive adhesive, in particular without solidification mechanism, and
    wherein the second adhesive is an adhesive with a solidification mechanism, in particular a two-component adhesive.

2. The measuring device according to claim 1, wherein the first adhesive surface is annular.

3. The measuring device according to claim 1, wherein the second adhesive surface is annular or disk-shaped.

4. The measuring device according to claim 1, wherein the filling and/or limit level sensor comprises a sensor housing and the attachment system comprises an attachment adapter.

5. The measuring device according to claim 4, wherein the first adhesive surface is arranged on the sensor housing and/or the attachment adapter.

6. The measuring device according to claim 4, wherein the second adhesive surface is arranged on the sensor housing and/or the attachment adapter.

7. The measuring device according to claim 1, wherein the second adhesive surface is configured such that, in the installed position (M) of the filling and/or limit level sensor on the container wall, it forms with the container wall a cavity for accommodating the second adhesive.

8. The measuring device according to claim 7, wherein the attachment system provides an adhesive filling opening reaching into the cavity and/or a vent opening.

9. The measuring device according to claim 8, wherein the adhesive filling opening is larger than the vent opening.

10. The measuring device according to claim 1, wherein the filling and/or limit level sensor is a radar sensor(S) and has a sensor unit for emitting and/or receiving a radar signal and/or an evaluation unit for determining, based on the radar signal, a measurement signal correlating with the filling level and/or the limit level.

11. An attachment system for attaching a filling and/or limit level sensor to a container wall of a container,
    wherein the attachment system comprises the following:
    a first adhesive surface,
    a second adhesive surface,
    a first adhesive arranged or for arrangement on the first adhesive surface, and
    a second adhesive arranged or for arrangement on the second adhesive surface,
    wherein the first adhesive is a pressure-sensitive adhesive, in particular without solidification mechanism, and
    wherein the second adhesive is an adhesive with a solidification mechanism, in particular a two-component adhesive.

12. A measuring assembly with
    a container having a container wall and
    a measuring device, wherein the measuring device is configured in accordance with claim 1, and the filling and/or limit level sensor of the measuring device is attached to the container wall by means of the attachment system of the measuring device.

13. A method for attaching a filling and/or limit level sensor to a container wall of a container with the following method steps:
    positioning the filling and/or limit level sensor and/or an attachment adapter on the container wall by gluing the filling and/or limit level sensor or the attachment adapter to the container wall by means of a first adhesive,
    gluing the filling and/or limit level sensor and/or the attachment adapter to the container wall by means of a second adhesive,
    wherein the first adhesive is a pressure-sensitive adhesive, in particular without solidification mechanism, and
    wherein the second adhesive is an adhesive with a solidification mechanism, in particular a two-component adhesive.

* * * * *